(12) United States Patent
Sawada

(10) Patent No.: US 8,786,718 B2
(45) Date of Patent: Jul. 22, 2014

(54) IMAGE PROCESSING APPARATUS, IMAGE CAPTURING APPARATUS, IMAGE PROCESSING METHOD AND STORAGE MEDIUM

(75) Inventor: Keiichi Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/356,078

(22) Filed: Jan. 23, 2012

(65) Prior Publication Data

US 2012/0212651 A1 Aug. 23, 2012

(30) Foreign Application Priority Data

Feb. 18, 2011 (JP) .................................. 2011-033862
Dec. 13, 2011 (JP) .................................. 2011-272754

(51) Int. Cl.
*H04N 5/225* (2006.01)
*H04N 5/228* (2006.01)
*H04N 13/02* (2006.01)
*H04N 5/262* (2006.01)
*H04N 9/64* (2006.01)
*G06K 9/40* (2006.01)

(52) U.S. Cl.
USPC ......... 348/218.1; 348/222.1; 348/47; 348/48; 348/239; 348/251; 382/254; 382/275

(58) Field of Classification Search
CPC ..... H04N 5/23238; H04N 9/09; H04N 9/093; H04N 13/0242; H04N 5/3572; G06T 5/001; G06T 5/20
USPC .................. 348/218.1, 239, 241, 251, 46, 47, 348/222.1, 246; 382/254, 275
See application file for complete search history.

(56) References Cited

U.S. PATENT DOCUMENTS

| | | | | |
|---|---|---|---|---|
| 6,744,471 | B1 * | 6/2004 | Kakinuma et al. | 348/371 |
| 2004/0061712 | A1 * | 4/2004 | Sogawa | 345/698 |
| 2004/0207734 | A1 * | 10/2004 | Horiuchi | 348/229.1 |
| 2005/0213838 | A1 * | 9/2005 | Kuramoto | 382/254 |
| 2006/0158520 | A1 * | 7/2006 | Funakura | 348/207.99 |

(Continued)

FOREIGN PATENT DOCUMENTS

| | | |
|---|---|---|
| CN | 101047768 A | 10/2007 |
| JP | 2010-114760 | 5/2010 |
| JP | 2010114760 | * 5/2010 |

OTHER PUBLICATIONS

Isaksen et al., Dynamically Reparameterized Light Fields, Proc. ACM. Siggraph, pp. 297-306, 2000.

(Continued)

*Primary Examiner* — Nhan T Tran
*Assistant Examiner* — Xi Wang
(74) *Attorney, Agent, or Firm* — Fitzpatrick, Cella, Harper & Scinto

(57) ABSTRACT

There is provided an image processing apparatus comprising: an acquisition unit configured to acquire captured images captured by a plurality of image capturing units for capturing an object from different viewpoints; a specifying unit configured to specify a defective image from the plurality of captured images; a determination unit configured to determine a weight for each captured image based on a position of the image capturing unit that has captured the defective image specified by the specifying unit; and a synthesis unit configured to generate a synthesized image by weighting and synthesizing the plurality of captured images based on the weights determined by the determination unit.

19 Claims, 17 Drawing Sheets

(56) References Cited

U.S. PATENT DOCUMENTS

2008/0165187 A1* 7/2008 Marugame .................... 345/420
2009/0087079 A1* 4/2009 Onoda .......................... 382/141
2010/0014778 A1* 1/2010 Imai ............................. 382/275
2011/0249889 A1* 10/2011 Kothandaraman et al. ... 382/154
2013/0010073 A1* 1/2013 Do et al. ........................ 348/46

OTHER PUBLICATIONS

Jan. 27, 2014 Chinese Office Action concerning Chinese Patent Appln. No. 201210039795.8.

* cited by examiner

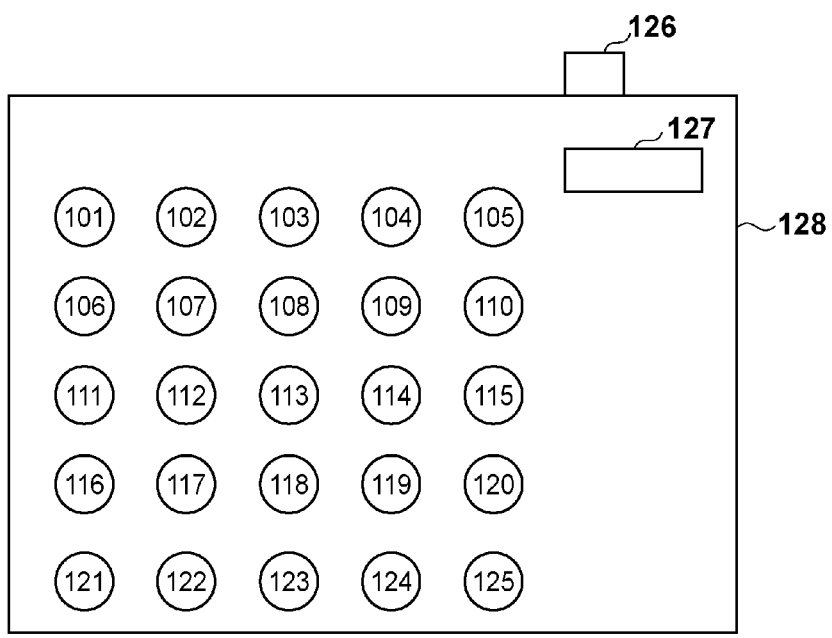
F I G. 1

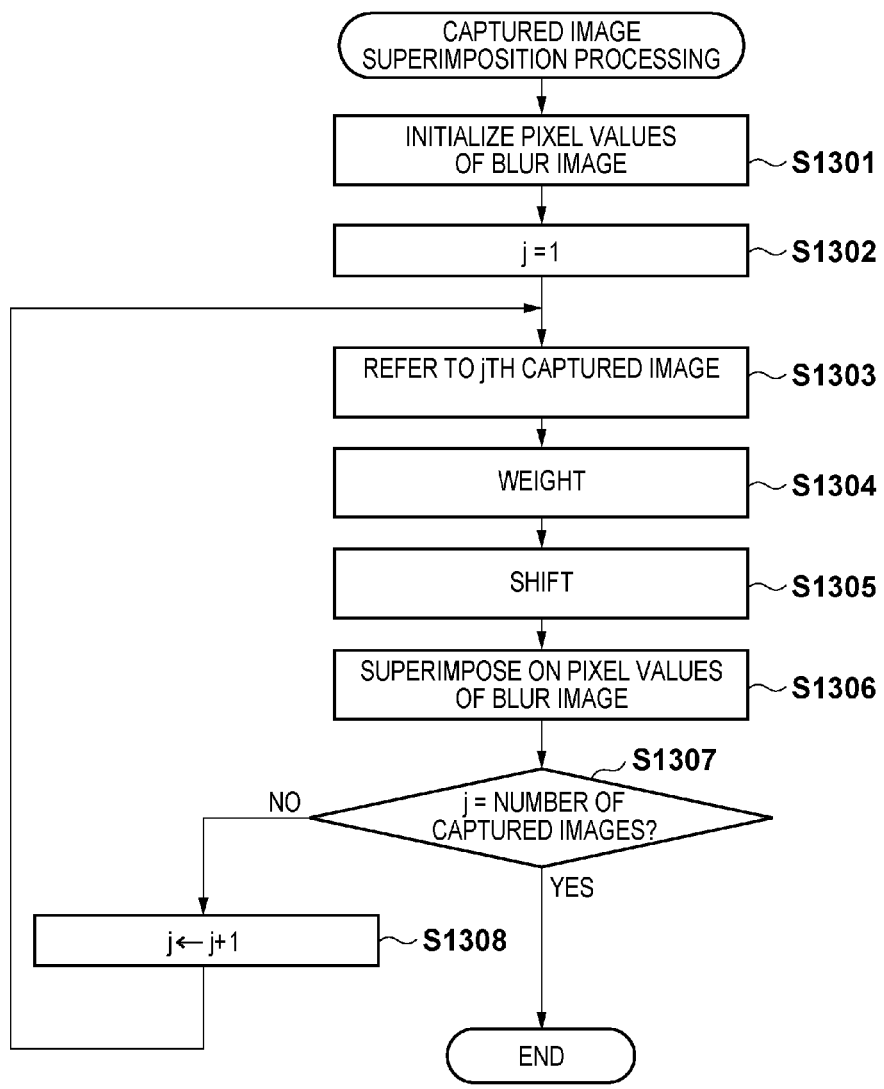
F I G. 13

FIG. 18

|  |  | IMAGE CAPTURING UNIT THAT HAS ACQUIRED DEFECTIVE IMAGE | | | | |
|---|---|---|---|---|---|---|
|  |  | 101 | 102 | ... | 124 | 125 |
| REMAINING IMAGE CAPTURING UNITS | 101 | 0.0 | 1.0 | ... | 0.8 | 0.0 |
|  | 102 | 0.8 | 0.0 | ... | 0.0 | 0.8 |
|  | 103 | 0.8 | 1.0 | ... | 1.0 | 1.0 |
|  | 104 | 0.7 | 0.0 | ... | 0.0 | 0.7 |
|  | 105 | 0.0 | 0.7 | ... | 0.5 | 0.0 |
|  | ⋮ | ⋮ | ⋮ | ⋮ | ⋮ | ⋮ |
|  | 124 | 0.8 | 0.0 | ... | 0.0 | 1.0 |
|  | 125 | 0.0 | 0.8 | ... | 1.0 | 0.0 |

F I G. 19
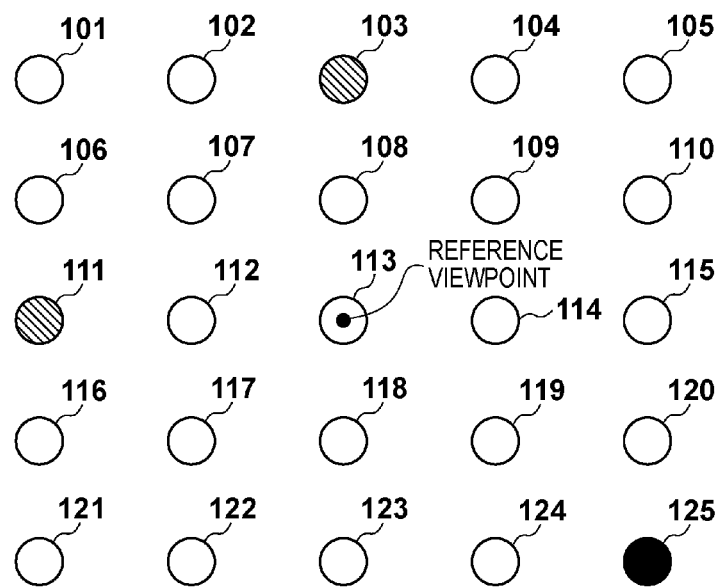

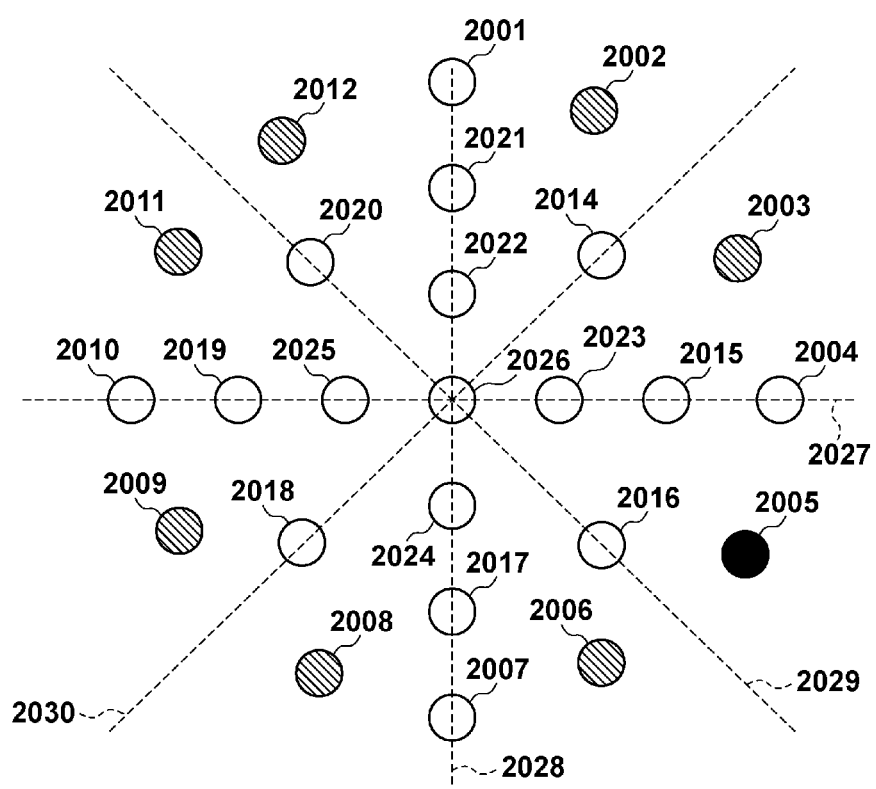
F I G. 20 ic # IMAGE PROCESSING APPARATUS, IMAGE CAPTURING APPARATUS, IMAGE PROCESSING METHOD AND STORAGE MEDIUM

BACKGROUND OF THE INVENTION

1. Field of the Invention

The present invention relates to an image capturing apparatus for acquiring captured images from multiple viewpoints and an image processing method thereof.

2. Description of the Related Art

An image capturing apparatus for acquiring captured images from multiple viewpoints has been proposed (for example, Aaron Isaksen et al. "Dynamically Reparameterized Light Fields", Proc. ACM. SIGGRAPH, pp. 297-306, 2000). This image capturing apparatus includes a plurality of image capturing units. Each image capturing unit captures an image, thereby acquiring captured images from multiple viewpoints. After the image capturing, the captured images are synthesized to generate an image (to be referred to as a blur image hereinafter) containing a blur corresponding to the distance from the reference viewpoint on the object, an image having a high spatial frequency, an image having a wide dynamic range, or the like. Especially, blur image generation has an effect of making the main object stand out by blurring the background and is useful in taking a photo of a person. Such an image capturing apparatus that captures images from multiple viewpoints will be referred to as a multi-eye camera hereinafter.

The multi-eye camera includes a lot of lenses as many as the number of image capturing units. For this reason, there is a high probability that the user shoots with the lenses covered with his/her finger. Covering the lenses with the user's finger will be referred to as "finger-covering" hereinafter. If a captured image group obtained by the multi-eye camera includes an image with a defect by finger-covering or the like, image synthesis may fail, or the accuracy may lower.

To prevent this, a technique has been proposed which notifies the user of detection of finger-covering on a multi-eye camera by highlighting in a display (for example, Japanese Patent Laid-Open No. 2010-114760). However, the user may ignore the notification and shoot without removing the finger.

SUMMARY OF THE INVENTION

The present invention has been made to solve the above-described problems, and provides a technique of, in an image capturing apparatus for acquiring captured images from multiple viewpoints, generating a blur image that maintains the symmetry of blurring even when a captured image group includes an image with a defect.

According to one aspect of the present invention, an image processing apparatus comprises: an acquisition unit configured to acquire captured images captured by a plurality of image capturing units for capturing an object from different viewpoints; a specifying unit configured to specify a defective image from the plurality of captured images; a determination unit configured to determine a weight for each captured image based on a position of the image capturing unit that has captured the defective image specified by the specifying unit; and a synthesis unit configured to generate a synthesized image by weighting and synthesizing the plurality of captured images based on the weights determined by the determination unit.

According to another aspect of the present invention, an image processing method comprises the steps of: acquiring captured images captured by a plurality of image capturing units for capturing an object from different viewpoints; specifying a defective image from the plurality of captured images; determining a weight for each captured image based on a position of the image capturing unit that has captured the defective image specified in the specifying step; and generating a synthesized image by weighting and synthesizing the plurality of captured images based on the weights determined in the determining step.

According to the present invention, a technique of, in an image capturing apparatus for acquiring captured images from multiple viewpoints, generating a blur image that maintains the symmetry of blurring even when a captured image group includes an image with a defect is provided.

Further features of the present invention will become apparent from the following description of exemplary embodiments (with reference to the attached drawings).

BRIEF DESCRIPTION OF THE DRAWINGS

FIG. 1 is a view showing the outer appearance of an image capturing apparatus (multi-eye camera) according to an embodiment of the present invention;

FIG. 13 is a flowchart illustrating captured image superimposition processing;

FIG. 18 is a table showing an example of a weight adjustment database according to the third embodiment;

FIG. 19 is a view schematically showing weight-adjusted image capturing units according to the third embodiment; and FIG. 20 is a view schematically showing image capturing units and symmetry axes according to the fourth embodiment.

DESCRIPTION OF THE EMBODIMENTS

Figure 2:
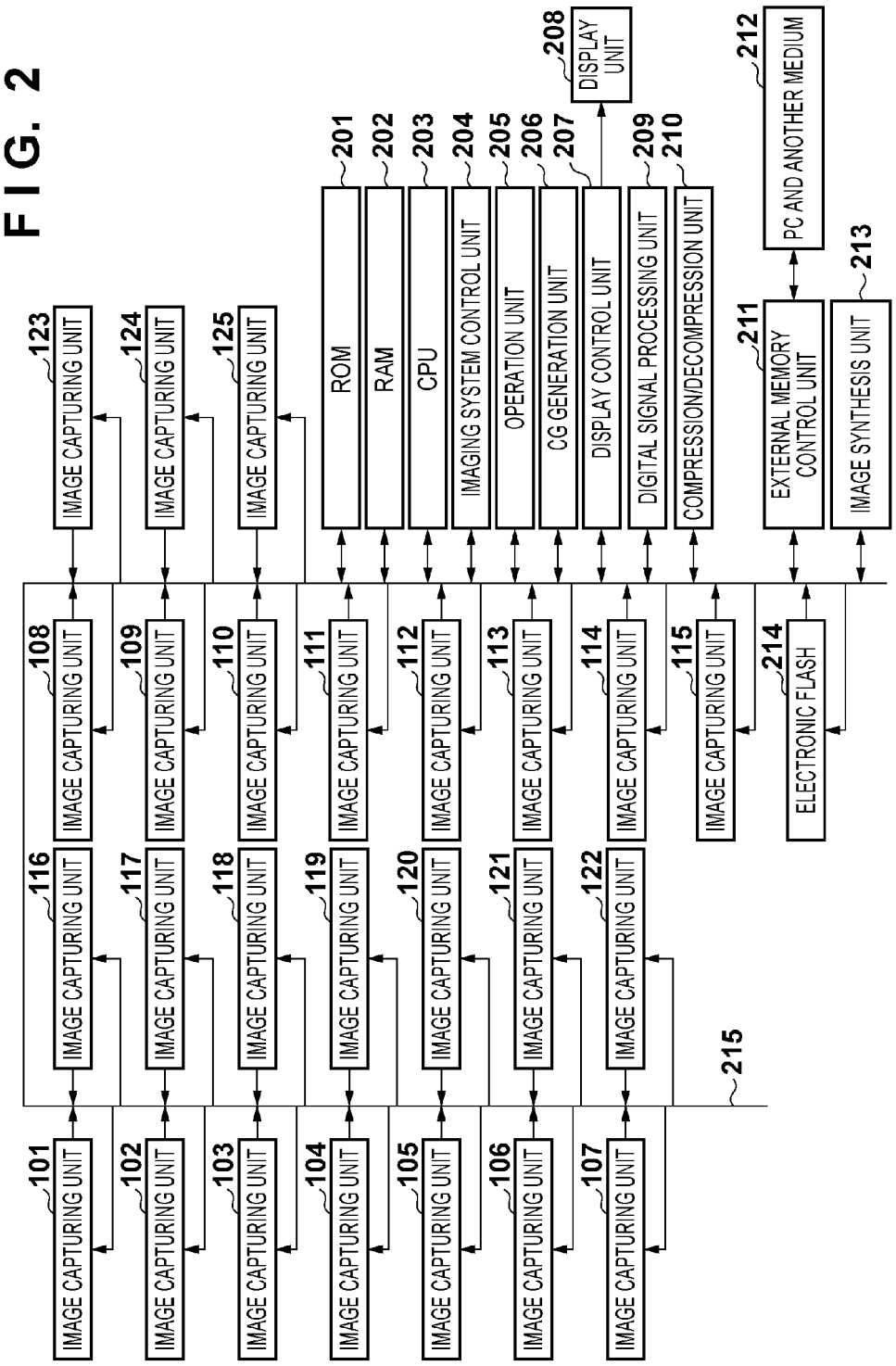
FIG. 2 is a block diagram showing the arrangement of the multi-eye camera.

The embodiments of the present invention will now be described in detail with reference to the accompanying drawings. Note that the following embodiments do not limit the present invention determined by the scope of claims, and not all the combinations of features described in the embodiments are essential to the solving means of the present invention.

First Embodiment

According to this embodiment, when generating a blur image captured from a predetermined reference viewpoint by synthesizing a plurality of captured images from different viewpoints, smaller weights are set for a defective image out of the plurality of captured images and a captured image located at a position symmetrical to the defective image, and the images are then synthesized. This makes it possible to generate a blur image that maintains the symmetry of blurring.

Apparatus Arrangement

FIG. 1 shows the outer appearance of an image capturing apparatus according to this embodiment. The image capturing apparatus of this embodiment is a so-called multi-eye camera which incorporates 25 image capturing units (cameras) arranged in a square matrix on a single plane to capture images from different viewpoints. Reference numerals 101 to 125 denote image capturing units; 126, a shooting button; 127, an electronic flash; and 128, a camera body. Note that the number of cameras incorporated in the multi-eye camera is not limited to this example (25), and the present invention is applicable to a multi-eye camera including image capturing units in an arbitrary number of 3 or more.

FIG. 2 is a block diagram showing the internal arrangement of the multi-eye camera according to this embodiment. Each of the image capturing units 101 to 125 shown in FIG. 1 receives optical information of an object by a sensor, A/D converts the signal to acquire digital data (captured image data) of the captured image, and outputs the digital data to a bus 215 serving as a data transfer path.

Figure 3:
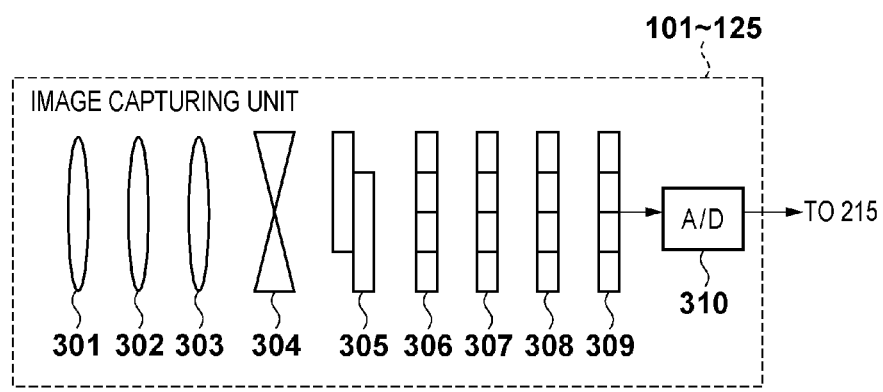
FIG. 3 is a block diagram showing the arrangement of each image capturing unit of the multi-eye camera.

FIG. 3 shows the detailed arrangement of each of the image capturing units 101 to 125, which will be explained. Each of the image capturing units 101 to 125 includes an imaging system for detecting the light amount of an object, and a conversion system for converting the detection result into a signal value. The imaging system includes a zoom lens 301, a focus lens 302, a blur correction lens 303, a stop 304, a shutter 305, an optical low-pass filter 306, an iR cut filter 307, a color filter 308, and a sensor 309 such as a CMOS or a CCD. The conversion system includes an A/D conversion unit 310 which converts the object light amount detected by the imaging system into digital data and outputs it to the bus 215.

Figure 4:
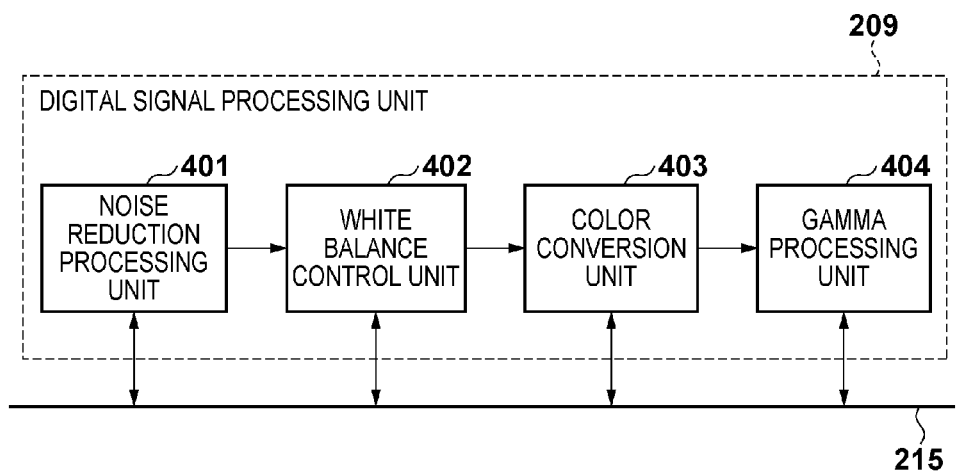
FIG. 4 is a block diagram showing processing of a digital signal processing unit.

Referring back to FIG. 2, a digital signal processing unit 209 receives the digital data of the captured image input via the bus 215 and performs various kinds of image processing. FIG. 4 shows the detailed arrangement of the digital signal processing unit 209. As shown in FIG. 4, the digital signal processing unit 209 includes a noise reduction processing unit 401, a white balance control unit 402, a color conversion unit 403, and a gamma processing unit 404. For the input digital data, the noise reduction processing unit 401 performs noise reduction processing, the white balance control unit 402 performs white balance processing, the color conversion unit 403 performs color correction processing, and the gamma processing unit 404 performs gamma processing, thereby generating a digital image signal. A compression/decompression unit 210 converts the digital image signal into a compressed file format such as jpeg or mpeg.

An external memory control unit 211 is an interface that connects the multi-eye camera to a PC or another medium 212 (for example, hard disk, memory card, CF card, SD card, or USB memory).

A CPU 203 is involved in image capturing control of the multi-eye camera and all processes of the components, by means of sequentially reading out instructions stored in a ROM 201 or a RAM 202, interpreting them, and executing processing in accordance with the result. The ROM 201 and the RAM 202 provide programs, data, work area, and the like necessary for the processing to the CPU 203.

An imaging system control unit 204 controls the imaging system based on an instruction of the CPU 203 to, for example, perform focusing, open the shutter, and adjust the stop. An electronic flash 214 irradiates the object with light.

An operation unit 205 corresponds to buttons, a mode dial, and the like through which user instructions are input.

A CG generation unit 206 generates characters, graphics, and the like. A liquid crystal display is widely used as a display unit 208 which displays characters and a captured image received from the CG generation unit 206, the digital signal processing unit 209, or an image synthesis unit 213 to be described later. The display unit 208 may have a touch screen function. In that case, a user instruction input from there can be handled as the input of the operation unit 205.

The image synthesis unit 213 generates a new image (blur image) using digital images obtained from the image capturing units 101 to 125 or a digital image group output from the digital signal processing unit 209, and outputs the result (synthesized image data) to the bus 215. The image synthesis unit 213 is the component featured by this embodiment, and details of its processing will be described later.

Note that the multi-eye camera according to this embodiment also includes constituent elements other than those described above. However, they are not the gist of the present invention, and a description thereof will be omitted.

Image Synthesis Processing

Figure 5:
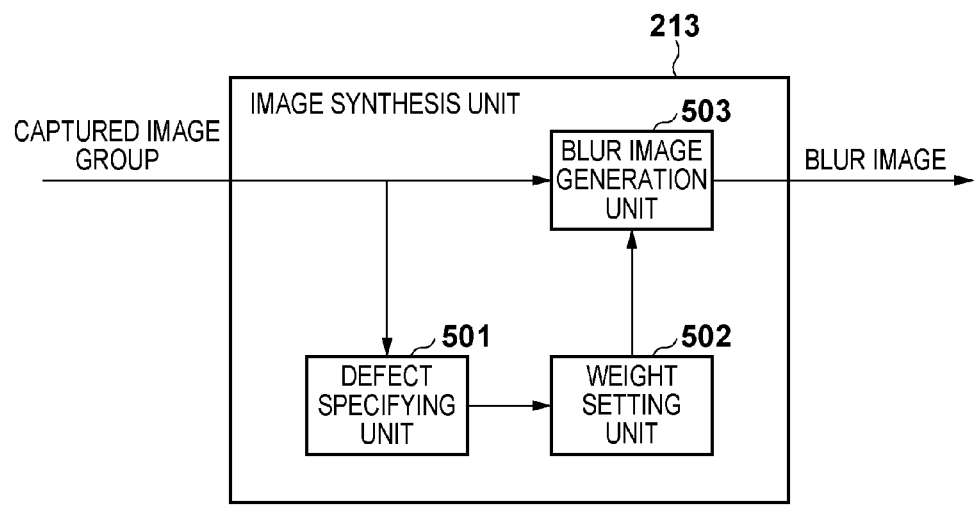
FIG. 5 is a block diagram showing the arrangement of an image synthesis unit.

The detailed arrangement of the image synthesis unit 213 will be described below with reference to FIG. 5. The image synthesis unit 213 generates a blur image from a captured image group input from the image capturing units 101 to 125 with different viewpoints for the object and outputs the blur image.

Figure 6:
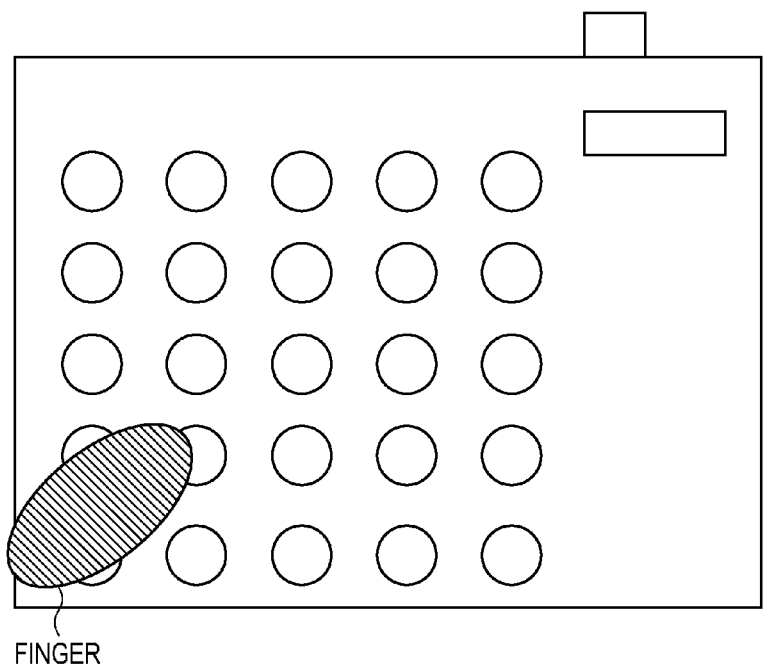
FIG. 6 is a view schematically showing an example of finger-covering.

First, a defect specifying unit 501 specifies, as a defective image (defective image data) to be excluded from the image to be synthesized, an image in which at least part of the object image that should have been captured is missing due to finger-covering or the like, from a captured image group acquired by the image capturing units 101 to 125. FIG. 6 is a schematic view of finger-covering. Specifying the defective image in the defect specifying unit 501 can be done using a known method of, for example, comparing captured images obtained by the plurality of image capturing units. For example, when a captured image includes an extremely dark portion relative to other captured images, the captured image is specified as an image in which finger-covering has occurred. When a captured image has an AF (Auto Focus) evaluation value that is high at a distance extremely close to the image capturing unit relative to other captured images, the captured image is specified as an image in which finger-covering has occurred. Note that the defective image need not always be an image with finger-covering, and any image captured under an abnormal image capturing condition with the existence of a lens contamination, a flaw, or the like can be specified as a defective image. In addition, pre-shooting may be done before actual shooting to specify a defective image from the pre-captured image group.

Based on the viewpoint of the defective image specified by the defect specifying unit 501, a weight setting unit 502 sets the weight for each of the captured images acquired by the image capturing units 101 to 125. Details of the weight setting processing will be described later.

A blur image generation unit 503 synthesizes the captured image group acquired by the image capturing units 101 to 125 at a predetermined reference viewpoint, thereby generating a blur image captured from the reference viewpoint. The reference viewpoint is a virtual viewpoint where the blur image is captured. In this embodiment, the gravity center of the viewpoints of the captured images is defined as the reference viewpoint. For example, in the example of the multi-eye camera shown in FIG. 1, a position identical to the viewpoint of the image capturing unit 113 located at the center of all the image capturing units 101 to 125 is the reference viewpoint.

Figure 8:
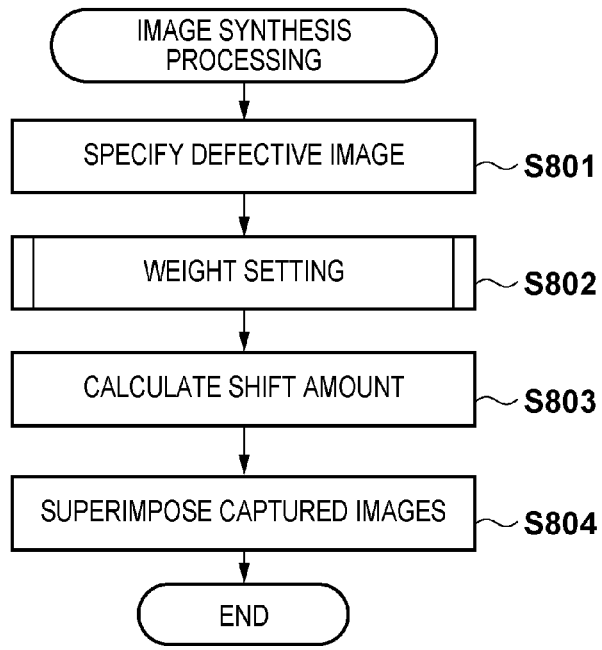
FIG. 8 is a flowchart illustrating image synthesis processing.

The image synthesis processing of the image synthesis unit 213 will be described here with reference to the flowchart of FIG. 8. In step S801, the defect specifying unit 501 specifies a defective image from a captured image group acquired by the image capturing units 101 to 125. In step S802, the weight setting unit 502 sets the weight of each captured image. In step S803, the blur image generation unit 503 calculates the shift amount from the viewpoint of each captured image to the reference viewpoint. In step S804, the captured images are weighted and superimposed. A blur image is thus generated.

Weight Setting Processing (S802)

The weight setting processing of the weight setting unit 502 will be described below in detail. This processing corresponds to the weight setting processing in step S802 of FIG. 8.

Figure 9:
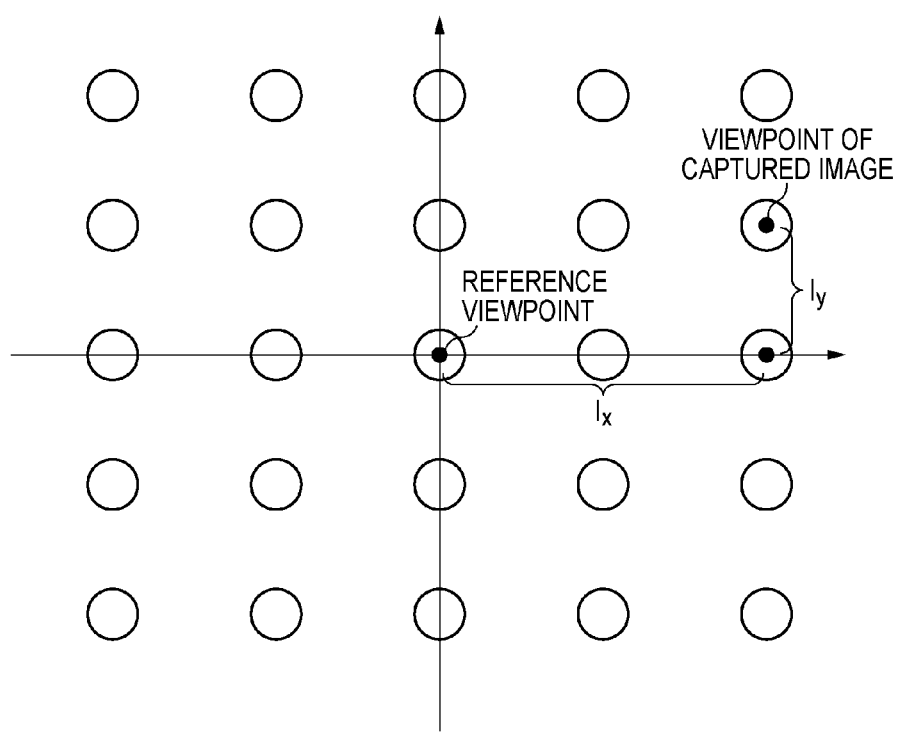
FIG. 9 is a view schematically showing the distance relationship between a reference viewpoint and the viewpoint of a captured image.

The weight setting unit 502 sets weights to be used to weight and superimpose the captured images in captured image superimposition processing to be described later. For example, when a weight wi corresponding to the distance between the reference viewpoint and the viewpoint of each captured image is calculated and used at the time of captured image superimposition processing, the blurring in the generated blur image becomes point-symmetrical about the reference viewpoint. The weight wi is given by $$wi = k \cdot w'i \quad (1)$$

$$w'i = \exp(-(\sqrt{(lx^2 + ly^2)})/C) \quad (2)$$

where i is the identifier to identify each captured image, k is the normalization coefficient to be described later, w'i is the weight before normalization, and C is an arbitrary constant. In addition, lx and ly are the distances between the reference viewpoint and the viewpoint of each captured image in the horizontal direction (the direction in which the image capturing units 101 to 105 are arranged in FIG. 1) and the vertical direction perpendicular to the horizontal direction, as shown in FIG. 9. As is apparent from equation (1), the longer the distance between the reference viewpoint and the viewpoint of an captured image is, the smaller the weight is.

If an captured image contains a defect, and the defective image is used to generate a blur image, the blur image will have poor quality or fail. In this embodiment, the weight wi of a captured image determined as a defective image by the defect specifying unit 501 is set to 0 so as not to reflect the captured image on blur image generation, that is, not to use the captured image for blur image generation. However, when the weight wi of the defective image is 0, the symmetry of the weights wi about the reference viewpoint breaks, and the symmetry of blurring also breaks. In this embodiment, the weights wi other than that of the defective image are adjusted to maintain the symmetry of the weights wi of the captured images about the reference viewpoint.

Figure 10:
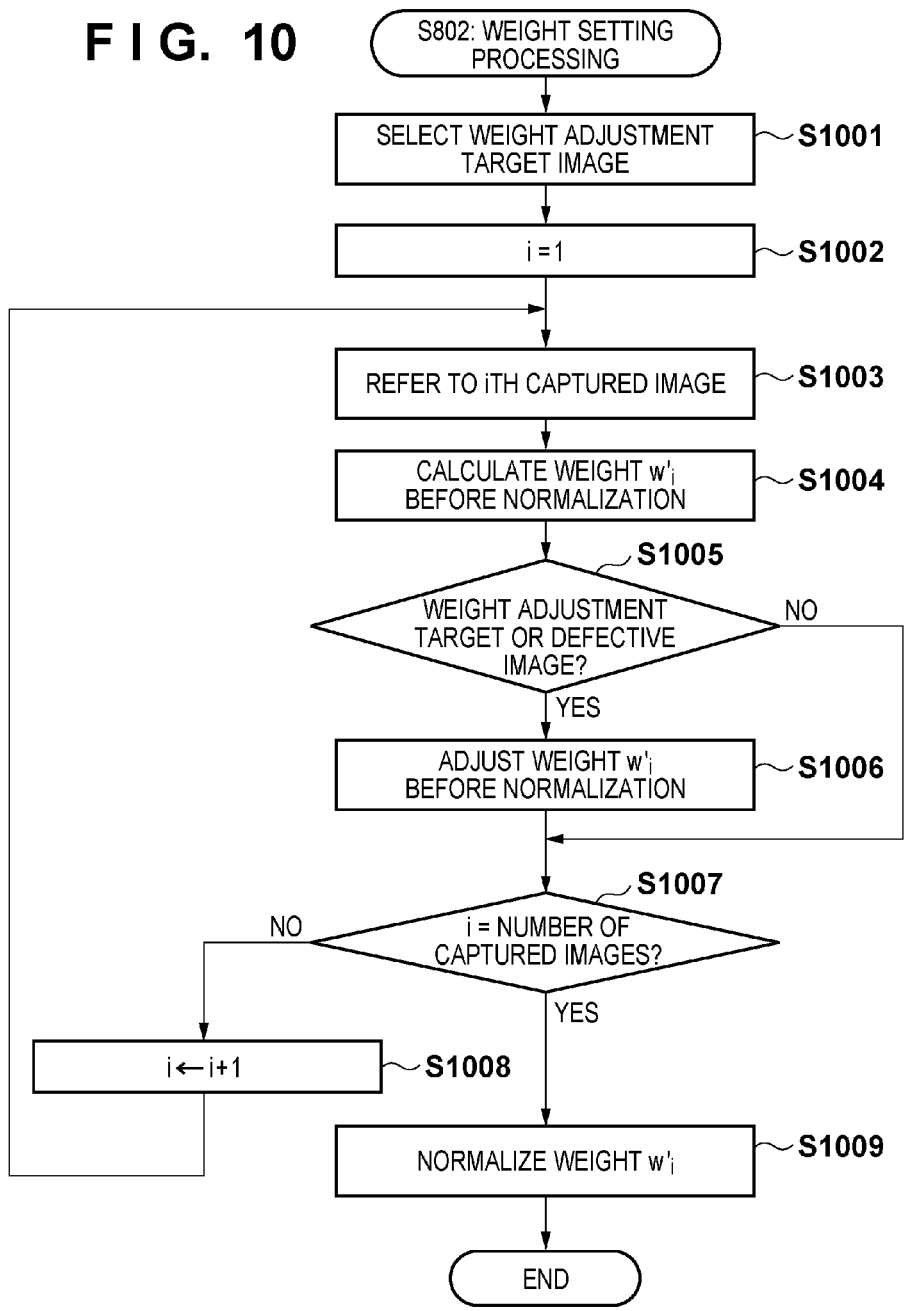
FIG. 10 is a flowchart illustrating weight setting processing.

FIG. 10 is a flowchart illustrating the weight setting processing of the weight setting unit 502. In step S1001, captured images acquired by the image capturing units located at positions symmetrical about the reference viewpoint to the image capturing unit that has acquired the defective image are selected as weight adjustment images that are the targets of weight adjustment.

Figure 11:
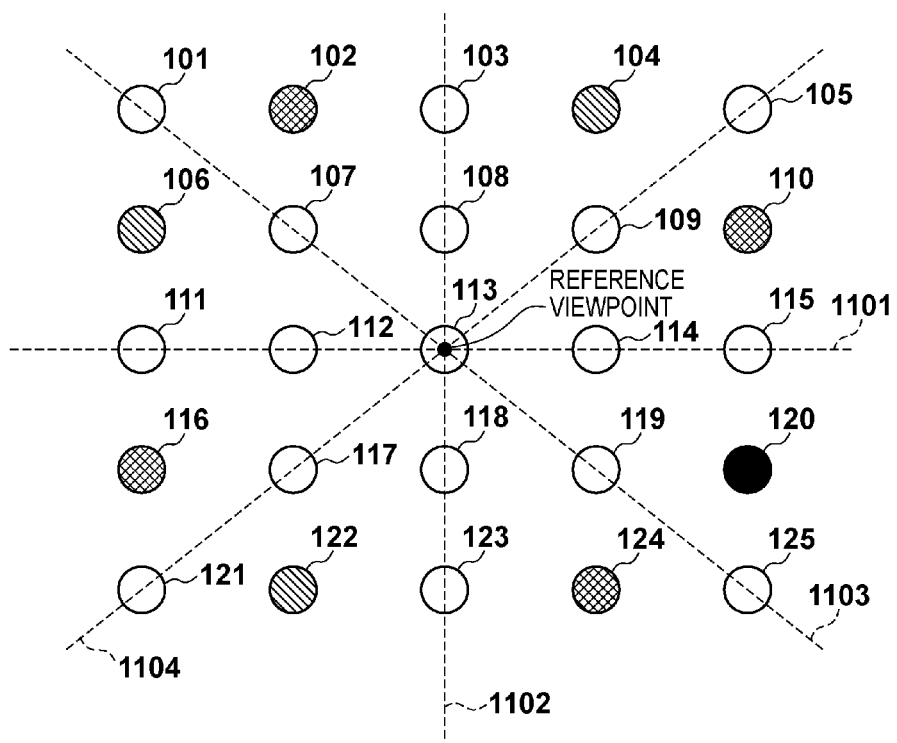
FIG. 11 is a view schematically showing symmetry axes passing through the reference viewpoint and the image capturing units.

The weight adjustment image selection method will be described here with reference to FIG. 11. FIG. 11 schematically shows the image capturing units 101 to 125 and four symmetry axes 1101 to 1104 passing through the reference viewpoint of the image capturing unit 113. For example, assume that the captured image acquired by the image capturing unit 120 is specified as the defective image. In this case, the captured images acquired by the following total of seven image capturing units are selected as weight adjustment images for the defective image. First, the image capturing units 110, 116, 124, and 102 at the positions line-symmetrical to the image capturing unit 120 about the symmetry axes 1101, 1102, 1103, and 1104 are selected. In addition, the image capturing unit 104 at the position line-symmetrical to the image capturing unit 110 about the symmetry axis 1104, the image capturing unit 122 at the position line-symmetrical to the image capturing unit 116 about the symmetry axis 1104, and the image capturing unit 106 at the position line-symmetrical to the image capturing unit 102 about the symmetry axis 1103 are selected. The captured images acquired by the seven thus selected image capturing units 102, 110, 116, 124, 104, 106, and 122 are the weight adjustment images.

As described above, in this embodiment, the second image capturing units 110, 116, 124, and 102 at the positions symmetrical to the first image capturing unit 120 about the plurality of lines 1101, 1102, 1103, and 1104 passing through the reference viewpoint are specified first. In addition, the third image capturing units 104, 122, and 106 at the positions symmetrical to the second image capturing units 110, 116, 124, and 102 about the lines 1101, 1102, 1103, and 1104 are specified. The images captured by the second and third image capturing units 102, 110, 116, 124, 104, 106, and 122 are selected as the weight adjustment images. In this way, the image capturing units of the defective image and the weight adjustment images are arranged around the reference viewpoint so as to be point-symmetrical to each other about the reference viewpoint.

Note that actually, all lines passing though the reference viewpoint need to be considered as the symmetry axes. That is, all image capturing units at the positions symmetrical to the image capturing unit 120 about arbitrary lines passing through the reference viewpoint need to be selected as the image capturing units of weight adjustment images. In the example of the multi-eye camera shown in FIG. 11, however, since the image capturing units exist only at the positions line-symmetrical about the four symmetry axes 1101 to 1104, only the four symmetry axes 1101 to 1104 are shown.

Note that to maintain the symmetry of blurring after synthesis according to this embodiment, an image captured by the image capturing units at the positions point-symmetrical about the reference viewpoint to the image capturing unit that has captured the defective image are selected as the weight adjustment images. As a matter of course, the symmetry of blurring is more accurately maintained by interspersing the plurality of image capturing units at symmetrical positions around the reference viewpoint, as shown in FIG. 11.

When the weight adjustment images are selected in the above-described way, 1 is set to an index i to identify a captured image in step S1002. In step S1003, the ith captured image is set as the image of interest. In step S1004, the weight w'i before normalization for the image of interest is calculated by equation (2). In step S1005, it is determined whether the image of interest is a weight adjustment image or a defective image. If the image of interest is a weight adjustment image or a defective image, adjustment is done in step S1006 to set the weight w'i before normalization to 0. If the image of interest is neither a weight adjustment image nor a defective image in step S1005, the weight w'i before normalization is not adjusted. Since w'i is set to 0 for a defective image and a weight adjustment images, the distribution of the weights wi of the captured images is almost point-symmetrical about the reference viewpoint.

In step S1007, it is determined whether i has reached the number of captured images. If i has not reached, i is incremented by one in step S1008. The processing of steps S1003 to S1007 is repeated until i reaches the number of captured images. When i has reached the number of captured images, the weights w'i of the captured images are normalized in step S1009. The weights w'i are normalized by setting the normalization coefficient k of equation (1) such that the sum of the weights w'i of the captured images becomes 1.0.

As described above, the captured images by the image capturing units at the positions symmetrical about the reference viewpoint to the image capturing unit that has acquired the defective image are selected as the weight adjustment images, and the weights of the images are adjusted to 0, thereby maintaining the symmetry of blurring about the reference viewpoint.

In the above-described example, the weight w'i before normalization is adjusted to 0 for both the defective image and the weight adjustment images. However, the weight adjustment method is not limited to this example. Adjustment is done to make the weight w'i smaller than the value calculated by equation (2) in step S1004. To emphasize the symmetry, the weight of the defective image and those of the weight adjustment images may equal. The weight formulas are not limited to equations (1) and (2), and calculating a weight corresponding to the position of each image capturing unit suffices.

When the number of weight adjustment images exceeds a predetermined number, a warning may be displayed on the display unit 208 to notify the user of it. The warning allows the user to know that the number of weight adjustment images exceeds the upper limit, that is, the number of defective images falls outside the allowable range.

Blur Image Generation Processing (S803, S804)

The blur image generation processing of the blur image generation unit 503 will be described below in detail. This processing corresponds to the shift amount calculation processing in step S803 and the captured image superimposition processing in step S804 of FIG. 8.

Figure 7:
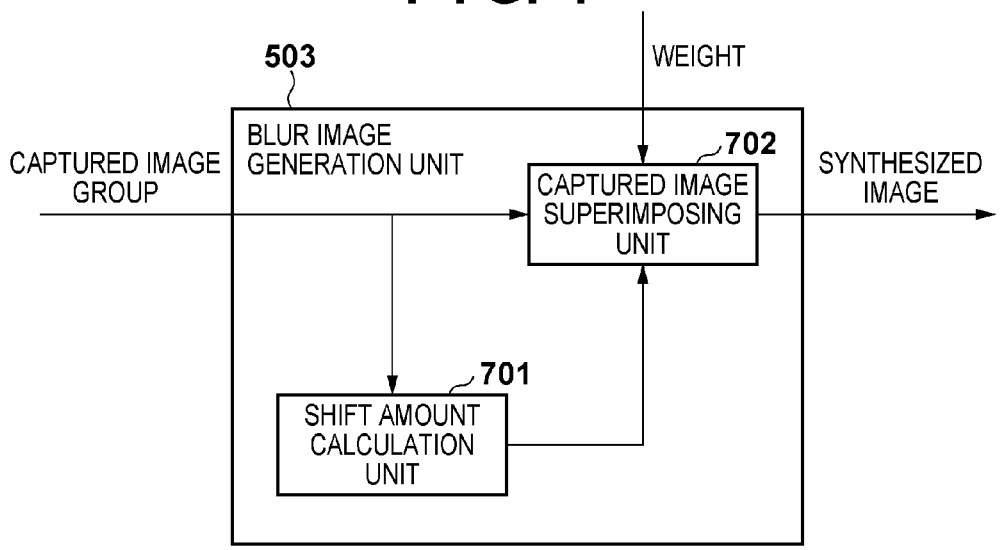
FIG. 7 is a block diagram showing the arrangement of a blur image generation unit.

FIG. 7 shows the detailed arrangement of the blur image generation unit 503. A shift amount calculation unit 701 calculates the shift amount from the viewpoint of each captured image to the reference viewpoint. A captured image superimposing unit 702 shifts each captured image by the shift amount calculated by the shift amount calculation unit 701 to make the viewpoint of each captured image match the reference viewpoint, and superimposes the images based on the weights set by the weight setting unit 502, thereby generating a blur image captured from the reference viewpoint.

Figure 12:
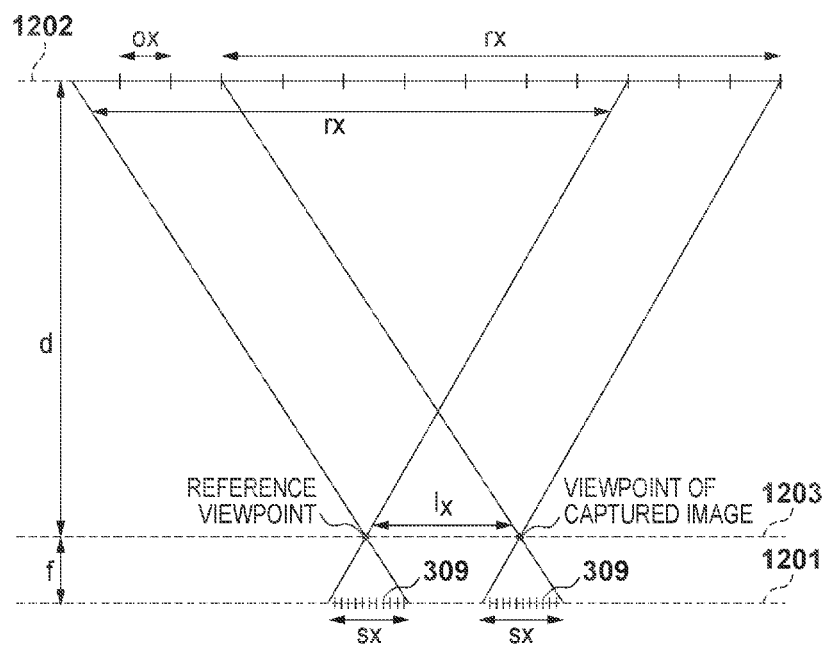
FIG. 12 is a view schematically showing the positional relationship between the object and the sensor of each image capturing unit.

The shift amount calculation processing of the shift amount calculation unit 701 will be described first with reference to FIG. 12. FIG. 12 is a view schematically showing the positional relationship between the object and the sensor of each image capturing unit. Referring to FIG. 12, a sensor plane 1201 is a plane on which the sensors 309 of the image capturing units 101 to 125 are located, an object focal plane 1202 is a plane at a distance where the image capturing units 101 to 125 are in focus, and a viewpoint plane 1203 is a plane including all viewpoints of the image capturing units 101 to 125. In addition, f is the focal length of the image capturing units 101 to 125, and sx is the length of the sensor 309 in the horizontal direction (the direction in which the image capturing units 101 to 105 are arranged in FIG. 1). Note that the number of horizontal pixels of the sensor 309 is represented by nx. In addition, rx is the horizontal length of the image capturing range of all pixels of the sensor 309 on the object focal plane 1202, ox is the horizontal length of the image capturing range of one pixel of the sensor 309 on the object focal plane 1202, lx is the horizontal distance between from the reference viewpoint to the viewpoint of a captured image, and d is the distance from the object focal plane 1202 to the viewpoint plane 1203.

In the shift amount calculation processing of this embodiment, the number of pixels by which each captured image needs to be shifted to make the captured image match the image captured from the reference viewpoint is calculated. Since the distance from the reference viewpoint to the viewpoint of each captured image is lx, the number of pixels corresponding to lx is calculated as the shift amount. The number px of pixels corresponding to lx on the viewpoint plane 1203 apart from the object focal plane 1202 by the distance d is given by $$px = lx/ox \quad (3)$$

$$ox = rx/nx \quad (4)$$

$$rx = sx \cdot (d/f) \quad (5)$$

In this embodiment, the thus calculated number px of pixels corresponding to lx for the distance d is defined as the shift amount from the viewpoint of each captured image to the reference viewpoint. In this case, the objects on the object focal plane 1202 separated from the viewpoint plane 1203 by the distance d exactly overlap in the captured images. Hence, no blur occurs when the captured images are superimposed. On the other hand, for an object separated from the viewpoint plane 1203 by a distance other than d, that is, at a position shifted from the object focal plane 1202, the number of pixels corresponding to lx changes. For this reason, the objects do not overlap in the captured images, and blur occurs after superimposition.

The horizontal shift amount px has been described above. A vertical shift amount py is similarly given by $$py = ly/oy \quad (6)$$

$$oy = ry/ny \quad (7)$$

$$ry = sy \cdot (d/f) \quad (8)$$

where ly is the vertical distance from the reference viewpoint to the viewpoint of each captured image, ny is the number of vertical pixels of the sensor 309, ry is the vertical length of the image capturing range of all pixels of the sensor 309 on the object focal plane 1202, oy is the vertical length of the image capturing range of one pixel of the sensor 309 on the object focal plane 1202, and sy is the vertical length of the sensor 309.

The captured image superimposition processing of the captured image superimposing unit 702 will be described next with reference to the flowchart of FIG. 13. In step S1301, the pixel values of all pixels of the blur image are initialized to 0. In step S1302, 1 is set to an index j to identify a captured image. In step S1303, the jth captured image is set as the image of interest. In step S1304, the pixel values of all pixels of the image of interest are weighted using the weight set by the weight setting unit 502. This weighing is done by $$v'jk=wj \cdot vjk \qquad (9)$$

where vjk is the pixel value before weighting, wj is the weight of the captured image, v'jk is the pixel value after weighting, and k is the identifier representing each pixel of the captured image.

In step S1305, the image of interest is shifted in the direction of the reference viewpoint by the shift amount calculated by the shift amount calculation unit 701, thereby making the viewpoint of the image of interest match the reference viewpoint. In step S1306, the pixel values of the image of interest are superimposed on those of the blur image.

In step S1307, it is determined whether j has reached the number of captured images. If j has not reached, j is incremented by one in step S1308. The processing of steps S1303 to S1307 is repeated until j reaches the number of captured images. When j has reached the number of captured images, the blur image generation is completed.

As described above, according to this embodiment, captured images acquired by the image capturing units located at the positions symmetrical about the reference viewpoint to the image capturing unit that has acquired the defective image are selected. A blur image is generated by setting smaller weights (for example, 0) for the captured images. This allows to maintain the symmetry of blurring in the blur image.

In this embodiment, a multi-eye camera including 25 image capturing units arranged in a square matrix has been exemplified. However, the arrangement of image capturing units in the multi-eye camera of the present invention is not limited to the square matrix, and any other matrix arrangement is applicable.

Second Embodiment

The second embodiment of the present invention will be described below. In the above-described first embodiment, the gravity center of the viewpoints of the image capturing units 101 to 125 is defined as the reference viewpoint. Smaller weights are set for the captured images acquired by the image capturing units located at the positions symmetrical about the reference viewpoint to the image capturing unit that has acquired the defective image. In the second embodiment, an example will be described in which the reference viewpoint is decided in accordance with the viewpoint of the defective image, and the weights are changed such that the weights of the captured images maintain the symmetry about the reference viewpoint.

Note that the arrangement of an image capturing apparatus according to the second embodiment is the same as the arrangement shown in FIGS. 1 and 2 of the above-described first embodiment, and a description thereof will be omitted. In the second embodiment, the processing of an image synthesis unit 213 is different from the first embodiment. Hence, image synthesis processing according to the second embodiment will be described below in detail.

Image Synthesis Processing

Figure 14:
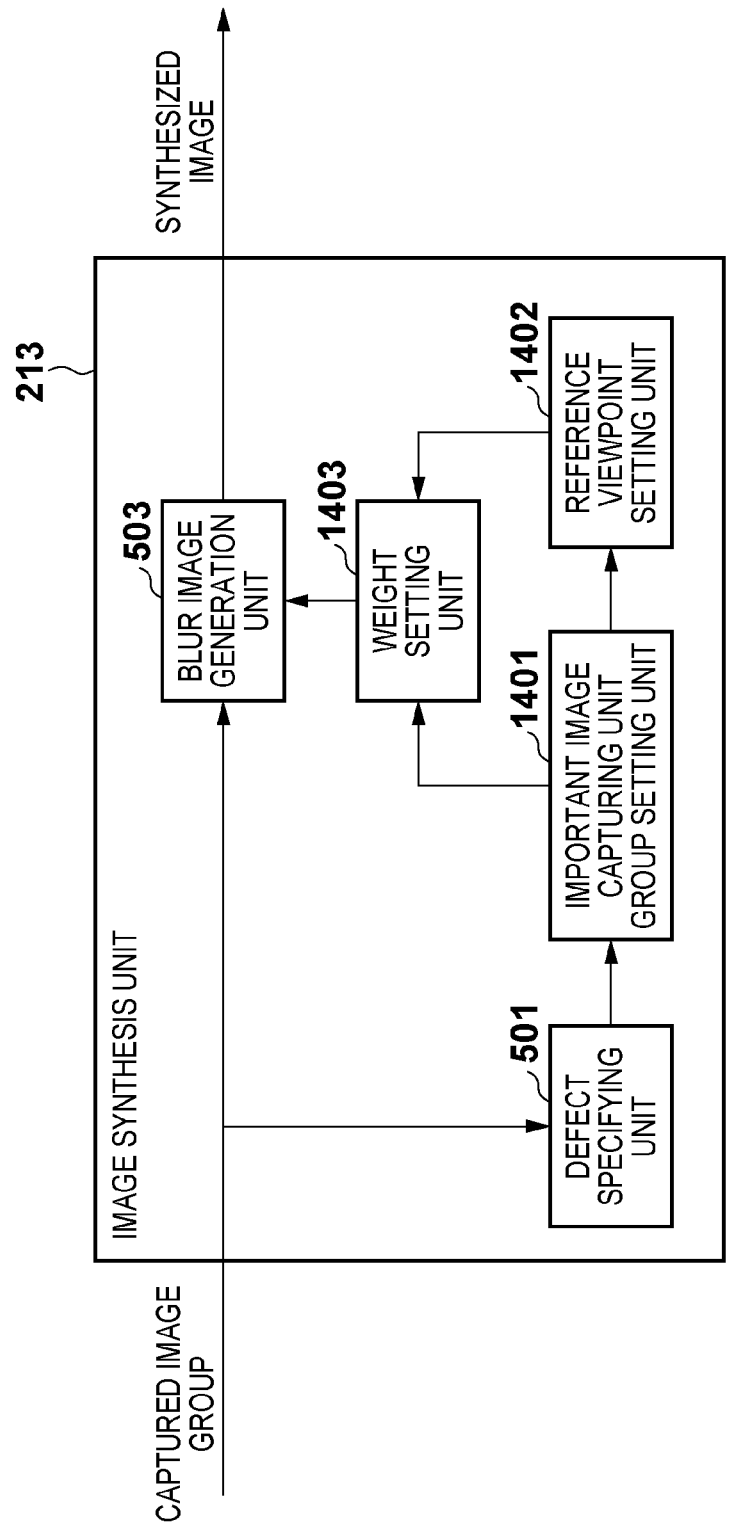
FIG. 14 is a block diagram showing the arrangement of an image synthesis unit according to the second embodiment.

The detailed arrangement of the image synthesis unit 213 according to the second embodiment will be described with reference to FIG. 14. The image synthesis unit 213 according to the second embodiment includes a defect specifying unit 501, an important image capturing unit group setting unit 1401, a reference viewpoint setting unit 1402, a weight setting unit 1403, and a blur image generation unit 503. Note that the processes of the defect specifying unit 501 and the blur image generation unit 503 are the same as in the first embodiment, and a description thereof will be omitted. The important image capturing unit group setting unit 1401 decides important image capturing units to be referred to when generating a blur image. The reference viewpoint setting unit 1402 decides the reference viewpoint in accordance with the positions of the important image capturing units to be referred to when generating a blur image.

Figure 15:
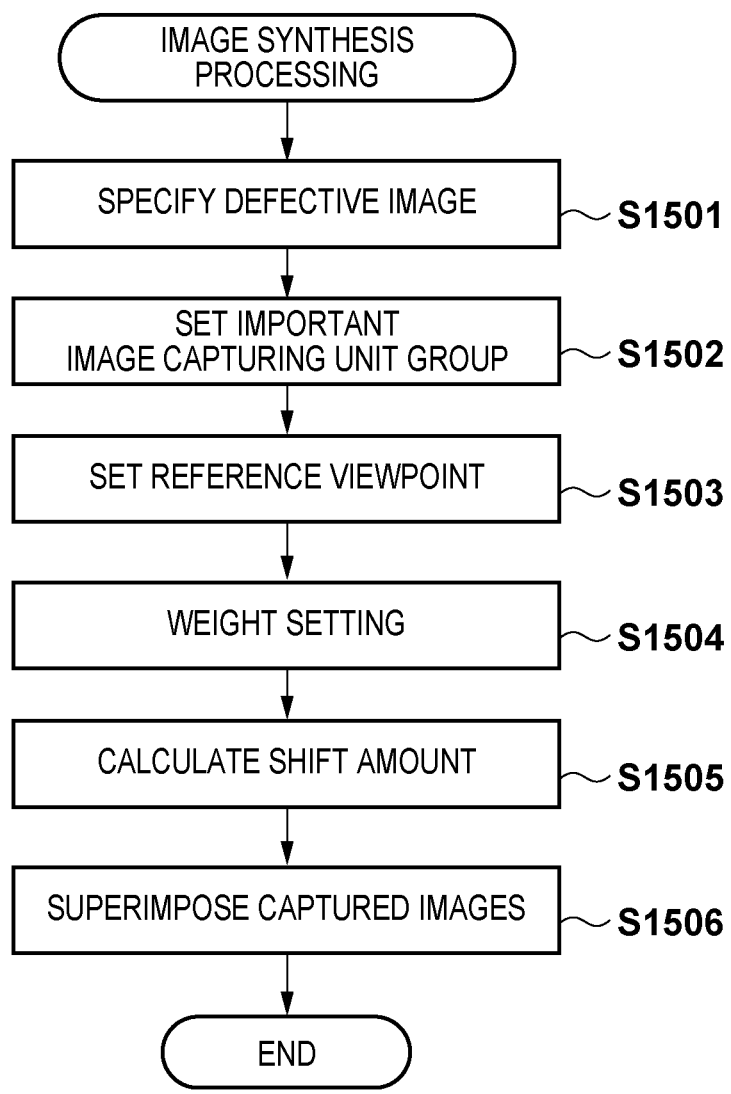
FIG. 15 is a flowchart illustrating image synthesis processing according to the second embodiment.

The image synthesis processing according to the second embodiment will be described with reference to the flowchart of FIG. 15. In step S1501, the defect specifying unit 501 specifies a defective image from a captured image group acquired by image capturing units 101 to 125. In step S1502, the important image capturing unit group setting unit 1401 sets an important image capturing unit group. In step S1503, the reference viewpoint setting unit 1402 sets the reference viewpoint. In step S1504, the weight setting unit 1403 sets the weight of each captured image. In step S1505, the blur image generation unit 503 calculates the shift amount from the viewpoint of each captured image to the reference viewpoint. In step S1506, the captured images are weighted and superimposed. A blur image is thus generated.

Figure 16A:
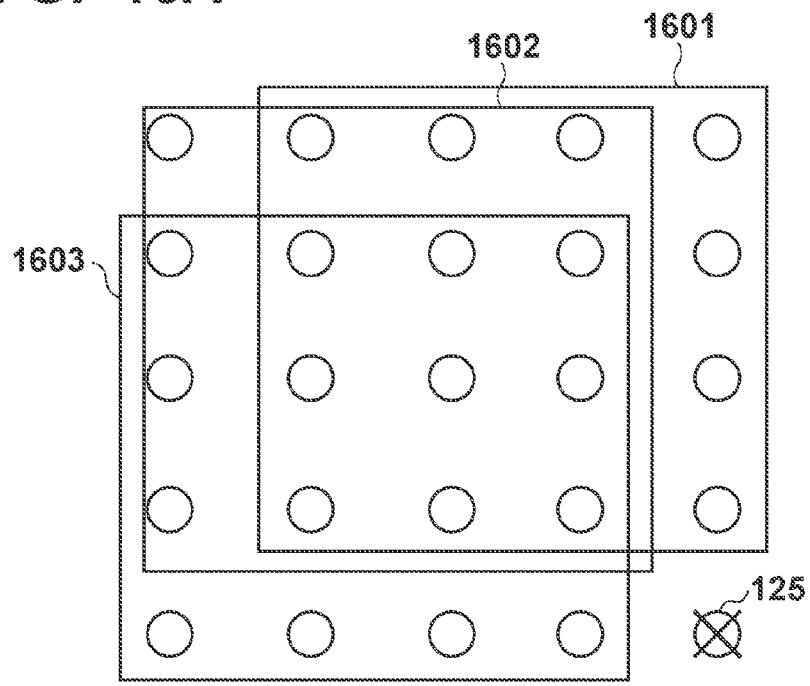
FIGS. 16A and 16B are views schematically showing examples of an important image capturing unit group according to the second embodiment.
Figure 16B:
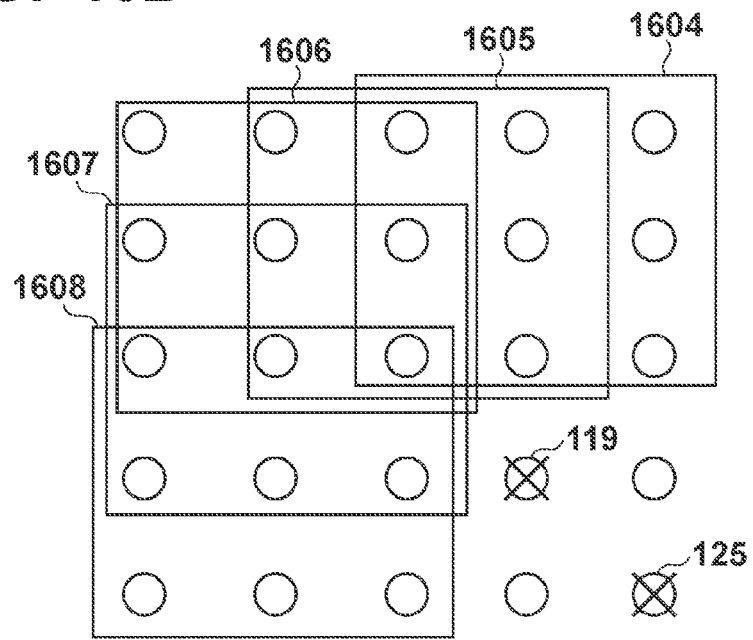

The important image capturing unit group setting processing of the important image capturing unit group setting unit 1401 will be described below with reference to FIGS. 16A and 16B. FIGS. 16A and 16B are views schematically showing the array of the image capturing units 101 to 125. The important image capturing unit group setting unit 1401 selects a plurality of image capturing units that form an image capturing unit group in an n×n square matrix, where n is a number as large as possible, in the image capturing units except the image capturing unit that has acquired the defective image. The image capturing unit group selected here is decided as the important image capturing unit group. For example, FIG. 16A shows candidates 1601 to 1603 for the important image capturing unit group when the defective image is the image captured by the image capturing unit 125. One of the candidates 1601 to 1603 is decided as the important image capturing unit group. FIG. 16B shows candidates 1604 to 1608 for the important image capturing unit group when the images captured by the image capturing units 119 and 125 are the defective images. One of the candidates is decided as the important image capturing unit group. Note that FIGS. 16A and 16B show examples in which n=4 and n=3, respectively.

Figure 17A:
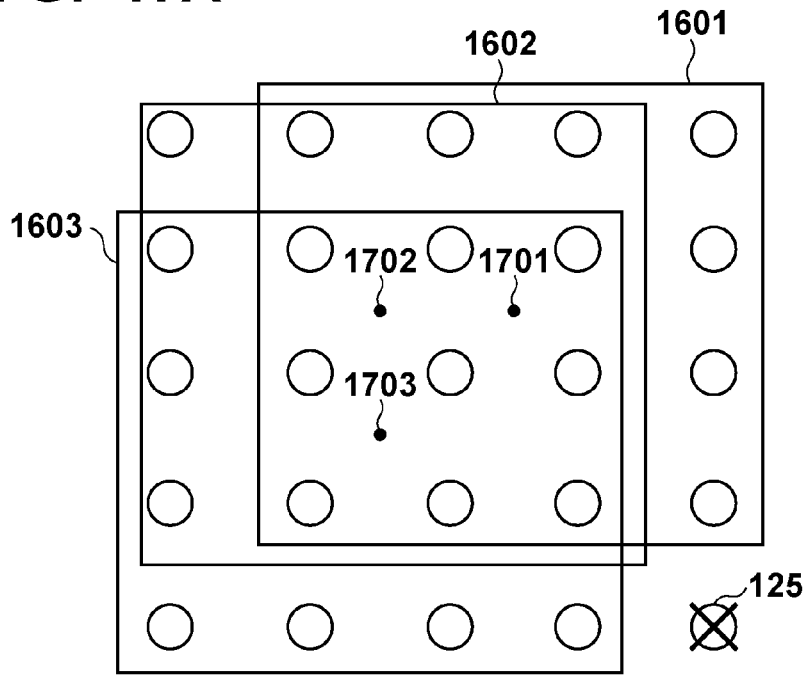
FIGS. 17A and 17B are views schematically showing the important image capturing unit group and the reference viewpoint according to the second embodiment.
Figure 17B:
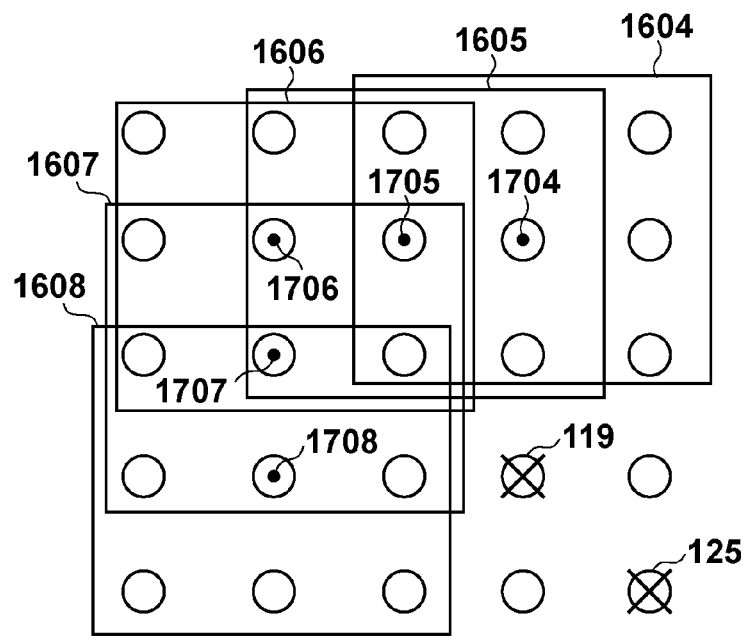

The reference viewpoint setting processing of the reference viewpoint setting unit 1402 will be described below with reference to FIGS. 17A and 17B. The reference viewpoint setting unit 1402 sets the gravity center of the important image capturing unit group set by the important image capturing unit group setting unit 1401 as the reference viewpoint. FIGS. 17A and 17B correspond to FIGS. 16A and 16B, respectively, and show examples of the reference viewpoint decided for each candidate of the important image capturing unit group. FIG. 17A shows reference viewpoints 1701 to 1703 each of which is set when a corresponding one of the candidates 1601 to 1603 is decided as the important image capturing unit group. FIG. 17B shows reference viewpoints 1704 to 1708 each of which is set when a corresponding one of the candidates 1604 to 1608 is decided as the important image capturing unit group.

The weight setting processing of the weight setting unit 1403 will be described below in detail. The weight setting unit 1403 sets the weights of the captured images in accordance with the flowchart of FIG. 10, like the weight setting unit 502 of the first embodiment. In the second embodiment, however, the weight adjustment image selection method in step S1001 is different from that of the first embodiment. In the second embodiment, out of the captured images acquired by the image capturing units that are not included in the important image capturing unit group, captured images except the defective image are selected as the weight adjustment images. When the weights are set to 0 for the thus selected weight adjustment images and the defective image, the distribution of the weights of the valid captured images is point-symmetrical about the reference viewpoint set by the reference viewpoint setting unit 1402. Note that the weights of the weight adjustment images and the defective image may be adjusted not to 0 but to be smaller than the value calculated in step S1004, as in the first embodiment.

As described above, according to the second embodiment, the reference viewpoint is decided in accordance with the viewpoint position of the defective image. A blur image is generated by changing the weights such that the weights of the captured images maintain the symmetry about the reference viewpoint. This allows to maintain the symmetry of blurring in the blur image.

Third Embodiment

The third embodiment of the present invention will be described below. In the above-described first embodiment, when synthesizing images, smaller weights are given to the captured image acquired by the image capturing unit that has acquired the defective image and the captured images acquired by the image capturing units located at the positions symmetrical about the reference viewpoint to the image capturing unit that has acquired the defective image. In the third embodiment, the method of deciding the weights of captured images acquired by the image capturing units is held in a database in advance in correspondence with each image capturing unit that is assumed to have acquired a defective image. The weights of the captured images acquired by the image capturing units are decided using the database.

Note that the arrangement of an image capturing apparatus according to the third embodiment is the same as the arrangement shown in FIGS. 1 and 2 of the above-described first embodiment, and a description thereof will be omitted. Processing according to the third embodiment is similar to that of the first embodiment except processing executed by a weight setting unit 502. The weight setting processing (S802) according to the third embodiment will be described below in detail.

Weight Setting Processing (S802)

Processing executed by the weight setting unit 502 according to the third embodiment will be described below. In the third embodiment as well, weights wi represented by equations (1) and (2) are calculated and then adjusted, as in the first embodiment. In the first embodiment, a smaller weight is set for the image capturing unit that has acquired the defective image. The weights are set smaller even for the images captured by the image capturing units at the positions symmetrical about the reference viewpoint to the image capturing unit that has acquired the defective image. In the third embodiment, however, the weights of the captured images are adjusted based on a weight adjustment database to be described later.

An example of the weight adjustment database will be described below with reference to FIG. 18. Referring to FIG. 18, each row corresponds to an image capturing unit whose weight is to be adjusted, and each column corresponds to an image capturing unit that has acquired a defective image. Each element corresponds to a coefficient Gai to be used to adjust the weight of an image capturing unit i when an image capturing unit a has acquired a defective image. When the image capturing unit a has acquired a defective image, the weight setting unit 502 calculates, for the image capturing unit i having the weight wi, an adjusted weight wi" by $$wi''=Gai \cdot wi \qquad (10)$$

The element Gai of the weight adjustment database has an arbitrary value. The smaller the difference between the distance from the image capturing unit i to the reference viewpoint and that from the image capturing unit a to the reference viewpoint is, the smaller the value of the element Gai can be. For example, the value of the element Gai of the weight adjustment database is decided by $$Gai=\exp(-abs(\sqrt{(lxa^2+lya^2)}-\sqrt{(lxi^2+lyi^2)} \cdot D)). \qquad (11)$$

where lxa and lya are the distances between the reference viewpoint and the image capturing unit a in the horizontal direction and the vertical direction perpendicular to the horizontal direction, and lxi and lyi are the distances between the reference viewpoint and the image capturing unit i in the horizontal direction and the vertical direction perpendicular to the horizontal direction. In addition, and abs(b) is the absolute value of b. Note that D is an arbitrary constant. D may be close to 1 except when the distance from the image capturing unit i to the reference viewpoint and that from the image capturing unit a to the reference viewpoint are sufficiently close. Creating the weight adjustment database in accordance with equation (11) makes it possible to set smaller weights for the images captured by the image capturing units including the image capturing unit a on concentric circles about the reference viewpoint.

Note that not the weights of all captured images need be adjusted based on the weight adjustment database. Processing of selectively adjusting the weights of the captured images using the weight adjustment database will be described below. FIG. 19 schematically shows the image capturing units. Referring to FIG. 19, the image capturing unit 125 is the image capturing unit that has acquired the defective image. The image capturing units 103 and 111 are the image capturing units of the weight adjustment target. The form of blurring can be kept symmetric by selecting the image capturing units of the weight adjustment target such that the gravity center is closer to the reference viewpoint position, as shown in FIG. 19. For example, the form of blurring can be kept symmetric by selecting the image capturing units of the weight adjustment target by $$\left| \sum_j l'_{xj} \right| < \varepsilon_x \qquad (12)$$

$$\left| \sum_j l'_{yj} \right| < \varepsilon_y \qquad (13)$$

where j represents the selected image capturing units including the image capturing unit that has acquired the defective image, l'xj and l'yj are the horizontal component of a direction vector from the reference viewpoint to the image capturing unit j and the vertical component perpendicular to the horizontal direction, respectively, and ϵx and ϵy are predetermined thresholds. When sufficiently small values are set as ϵx and ϵy, the gravity center of the image capturing units of the weight adjustment target becomes closer to the reference viewpoint position. As a result, the form of blurring can be kept symmetric. As the value of ϵx, for example, the horizontal distance between the reference viewpoint 113 and one of the image capturing units 108, 112, 114, and 118 adjacent to the reference viewpoint or a value smaller than the distance is usable. As the value of ϵy, for example, the vertical distance between the reference viewpoint 113 and one of the image capturing units 108, 112, 114, and 118 adjacent to the reference viewpoint or a value smaller than the distance is usable.

Alternatively, in consideration of the value of the element Gai of the weight adjustment database, the image capturing units of the weight adjustment target may be selected by $$\left| \sum_j G_{aj} l'_{xj} \right| < \varepsilon_x \quad (14)$$

$$\left| \sum_j G_{aj} l'_{yj} \right| < \varepsilon_y \quad (15)$$

According to inequalities (14) and (15), the image capturing units of the weight adjustment target can be selected such that the gravity center of the weights becomes closer to the reference viewpoint.

Note that a more natural blur image can be generated when the number of image capturing units of the weight adjustment target is smaller. Hence, out of image capturing unit combinations satisfying inequalities (12) and (13) or inequalities (14) and (15), a combination including a minimum number of image capturing units can be selected as the image capturing units of the weight adjustment target. On the other hand, the number of image capturing units of the weight adjustment target (except the image capturing unit that has acquired the defective image) need only be one or more. However, from the viewpoint of maintaining the symmetry of blurring, two or more image capturing units of the weight adjustment target may be selected, or three or more image capturing units may be selected.

As described above, according to the third embodiment, the weights of the captured images are adjusted based on the weight adjustment database. In addition, the weight adjustment images are selected such that the gravity center of the image capturing units of the weight adjustment target becomes closer to the reference viewpoint. This allows to maintain the symmetry of blurring in the blur image.

As described above, according to the third embodiment, when a defective image exists, the weights of the images are decided based on the position of the image capturing unit that has captured the defective image when weighting and synthesizing the images. More specifically, weight adjustment images (selected images) different from the defective image are selected based on the position of the image capturing unit that has captured the defective image. The weights of the weight adjustment images are then adjusted. In the third embodiment, the weight adjustment images are selected such that the gravity center of the image capturing units that have captured the weight adjustment images becomes closer to the reference viewpoint. At this time, the position of the reference viewpoint may be changed based on the position of the image capturing unit that has captured the defective image, as in the second embodiment. More specifically, the position of the reference viewpoint may be changed based on the positions of the image capturing units that have captured the images unselected as the weight adjustment images. More specifically, the position of the reference viewpoint can be set at the gravity center position of the image capturing units that have captured the images unselected as the weight adjustment images.

In the third embodiment, the weights are calculated by equations (1) and (2) and then adjusted. As described above, the adjustment can be done using the database or the formulas, as described in the first embodiment, or by multiplying the weights by a constant. The weights may be adjusted for the defective image and the weight adjustment images other than the defective image using different methods. For example, the weight of the defective image may be set to 0, and the weights of the weight adjustment images may other than the defective image may be calculated by the above-described method. This method is effective in the above-described example in which the weight adjustment images are selected such that the weighted gravity center of the image capturing units becomes closer to the reference viewpoint.

In the third embodiment, the weights are calculated by equations (1) and (2) and then adjusted. However, the weights of the captured images may directly be calculated based on the database or the formulas. In this case, the weight of each captured image is set to be smaller when the captured image is selected as the weight adjustment image than when it is not selected as the weight adjustment image.

Fourth Embodiment

The fourth embodiment of the present invention will be described below. In the above-described first to third embodiments, a case has been described in which images captured by the multi-eye camera including image capturing units arranged at the grid points on a single plane include a defective image. However, the present invention is applicable not only to the multi-eye camera including the image capturing units arranged but also to a multi-eye camera including image capturing units arranged arbitrarily. In the fourth embodiment, a method of generating a blur image maintaining the symmetry of blurring when images captured by a multi-eye camera including image capturing units arranged on concentric circles on a single plane include a defective captured image by finger-covering or the like will be described as an example.

Note that the arrangement of an image capturing apparatus according to the fourth embodiment is the same as the arrangement shown in FIGS. 1 and 2 of the above-described first embodiment except the arrangement of image capturing units, and a description thereof will be omitted. Processing according to the fourth embodiment is similar to that of the first embodiment except processing executed by a weight setting unit 502. The weight setting processing (S802) according to the fourth embodiment will be described below in detail.

Weight Setting Processing (S802)

A weight adjustment image selection method according to the fourth embodiment will be described below with reference to FIG. 20. FIG. 20 schematically shows image capturing units 2001 to 2026 arranged on concentric circles and four symmetry axes 2027 to 2030 passing through the reference viewpoint 2026 of the image capturing units. When the image capturing unit 2005 acquires a defective image, captured images acquired by the image capturing units 2002, 2003, 2006, 2008, 2009, 2011, and 2012 can be selected as the weight adjustment images, as in the first embodiment. The weights may be adjusted based on a weight adjustment database, as in the third embodiment.

As described above, in the fourth embodiment, the images are captured by the multi-eye camera including the image capturing units arranged on the concentric circles. Even if the images include a defective captured image by finger-covering or the like, it is possible to maintain the symmetry of blurring in the blur image by adjusting the weights of the captured images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-033862, filed Feb. 18, 2011 and 2011-272754, filed Dec. 13, 2011, which are hereby incorporated by reference herein in their entirety.

What is claimed is:

1. An image processing apparatus comprising:
an acquisition unit configured to acquire captured images captured by a plurality of image capturing units for capturing an object from different viewpoints;
a specifying unit configured to specify a defective image from the plurality of captured images;
a determination unit configured to determine a weight for each captured image based on a position of the image capturing unit that has captured the defective image specified by said specifying unit; and
a synthesis unit configured to generate a synthesized image by weighted synthesis of the plurality of captured images based on the weights determined by said determination unit,
wherein said determination unit is further configured to select at least one captured image different from the defective image as a selected image from the plurality of captured images, and determine the weights for each of the defective image and the selected image to be smaller than a weight of a captured image that is neither the defective image nor the selected image,
wherein said determination unit is further configured to determine a relationship between the weights and a reference viewpoint serving as a viewpoint of the synthesized image so that a gravity center of the image capturing units that have not captured the defective image or the selected image is set as the reference viewpoint.

2. The apparatus according to claim 1, wherein said specifying unit is further configured to specify the defective image by comparing the plurality of captured images.

3. The apparatus according to claim 1, wherein said determination unit is further configured to set the weight for the defective image to 0.

4. The apparatus according to claim 1, wherein said determination unit is further configured to
assign the weight to each of the plurality of captured images, and
adjust the assigned weight so as to be smaller for the defective image and the selected image.

5. The apparatus according to claim 4, wherein said determination unit is further configured to assign the weight to each of the plurality of captured images such that the weight becomes smaller as a distance from the image capturing unit that has captured the captured image to a reference viewpoint serving as a viewpoint of the synthesized image increases.

6. The apparatus according to claim 1, wherein the selected image is captured by the image capturing unit located at a position symmetrical about a reference viewpoint serving as a viewpoint of the synthesized image to a position of the image capturing unit that has captured the defective image.

7. The apparatus according to claim 6, wherein the selected image is captured by the image capturing unit located at a position line-symmetrical about a symmetry axis passing through the reference viewpoint to a position of the image capturing unit that has captured the defective image.

8. The apparatus according to claim 1, wherein said determination unit is further configured to determine the weight of the selected image by referring to a database.

9. The apparatus according to claim 1, wherein the selected image is selected such that a distance from the gravity center of the image capturing units each of which has captured the defective image or the selected image to a reference viewpoint serving as a viewpoint of the synthesized image is less than a predetermined threshold.

10. The apparatus according to claim 1, wherein said determination unit is further configured to set the gravity center position of the image capturing units that have not captured the defective image or the selected image as the reference viewpoint according to the determined weights.

11. The apparatus according to claim 1, wherein the plurality of image capturing units are arranged on grid points.

12. The apparatus according to claim 1, wherein the plurality of image capturing units are arranged on concentric circles.

13. The apparatus according to claim 1, further comprising a calculation unit configured to calculate a shift amount to align each of the plurality of captured images with an image obtained by image capturing from a reference viewpoint,
wherein said synthesis unit is further configured to shift each of the plurality of captured images based on the shift amount calculated by said calculation unit and synthesize the shifted images.

14. An image capturing apparatus comprising:
an image processing apparatus of claim 1; and
a plurality of image capturing units configured to capture an object from different viewpoints.

15. A non-transitory computer-readable storage medium storing a computer program for causing a computer to function as each unit of the image processing apparatus according to claim 1.

16. The apparatus according to claim 1, wherein the determination unit is further configured to determine the weights so that the gravity center position of the image capturing units that have not captured the defective image or the selected image is equal to a predetermined position of the reference viewpoint.

17. An image processing method comprising the steps of:
acquiring captured images captured by a plurality of image capturing units for capturing an object from different viewpoints;
specifying a defective image from the plurality of captured images;
determining a weight for each captured image based on a position of the image capturing unit that has captured the defective image specified in said specifying step; and
generating a synthesized image by weighted synthesis of the plurality of captured images based on the weights determined in said determining step,
wherein, in the determination step, at least one captured image different from the defective image is selected as a selected image from the plurality of captured images, and the weights for each of the defective image and the selected image are determined to be smaller than a weight of a captured image that is neither the defective image nor the selected image,
wherein, in the determination step, a relationship between the weights and a reference viewpoint serving as a viewpoint of the synthesized image is determined so that a gravity center of the image capturing units that have not captured the defective image or the selected image is set as the reference viewpoint.

18. An image processing apparatus comprising:
an acquisition unit configured to acquire captured images captured by a plurality of image capturing units for capturing an object from different viewpoints;
a specifying unit configured to specify a defective image from the plurality of captured images;
a determination unit configured to determine a weight for each captured image based on a position of the image capturing unit that has captured the defective image specified by said specifying unit; and
a synthesis unit configured to generate a synthesized image by weighted synthesis of the plurality of captured images based on the weights determined by said determination unit,
wherein said determination unit is further configured to select at least one captured image different from the defective image as a selected image from the plurality of captured images, and determine the weights for each of the defective image and the selected image to be smaller than a weight of a captured image that is neither the defective image nor the selected image,
wherein a reference viewpoint serving as a viewpoint of the synthesized image is placed at a gravity center of the image capturing units that have not captured the defective image or the selected image.

19. An image processing method comprising the steps of:
acquiring captured images captured by a plurality of image capturing units for capturing an object from different viewpoints;
specifying a defective image from the plurality of captured images;
determining a weight for each captured image based on a position of the image capturing unit that has captured the defective image specified in said specifying step; and
generating a synthesized image by weighted synthesis of the plurality of captured images based on the weights determined in said determining step,
wherein, in the determining step, at least one captured image different from the defective image is selected as a selected image from the plurality of captured images, and the weights for each of the defective image and the selected image to be smaller than a weight of a captured image that is neither the defective image nor the selected image,
wherein a reference viewpoint serving as a viewpoint of the synthesized image is placed at a gravity center of the image capturing units that have not captured the defective image or the selected image.

* * * * *